United States Patent [19]
Pizano

[11] Patent Number: 6,021,434
[45] Date of Patent: Feb. 1, 2000

[54] SYSTEM FOR DIGITAL VIDEO BROWSING USING TELEPHONE AND FAX

[75] Inventor: Arturo A. Pizano, Belle Mead, N.J.

[73] Assignee: Siemens Corporate Research, Inc., Princeton, N.J.

[21] Appl. No.: 08/815,786

[22] Filed: Mar. 12, 1997

[51] Int. Cl.[7] .............................. G06F 13/00; H04N 1/00
[52] U.S. Cl. .................... 709/219; 358/403; 707/104
[58] Field of Search .................... 379/47, 88.13, 379/93.14, 88.25, 88.17, 100.11, 100.12; 348/14, 7, 22, 700; 707/104; 358/434, 402, 403, 444, 438; 345/302; 709/219

[56] References Cited

U.S. PATENT DOCUMENTS

| | | | |
|---|---|---|---|
| 4,941,125 | 7/1990 | Boyne | 707/104 |
| 5,528,281 | 6/1996 | Grady | 348/14 |
| 5,537,461 | 7/1996 | Bridges | 379/88.17 |
| 5,568,540 | 10/1996 | Greco | 379/88.25 |
| 5,673,205 | 9/1997 | Brunson | 345/302 |
| 5,760,823 | 6/1998 | Brunson | 348/14 |
| 5,835,667 | 11/1998 | Wactlar et al. | 386/96 |

*Primary Examiner*—Scott Rogers
*Attorney, Agent, or Firm*—Donald B. Paschburg

[57] ABSTRACT

A system for viewing digital video stored in a remote location allows a user to first request a visual summary of the video which consists of still images corresponding to the frames where scenes change and then allows the user to utilize this information to control the playback of the audio track using the keypad of a touch-tone phone. The first main component, a digital video pre-processor, extracts information from the original video. This is performed in advance of the user's access. The second main component, a phone-based video-playback attendant, receives remote instructions from the user via the telephone and presents the requested information.

18 Claims, 2 Drawing Sheets

SYSTEM FOR DIGITAL VIDEO BROWSING USING TELEPHONE AND FAX

RELATED APPLICATIONS

This patent application is related to copending patent application Ser. No. 08/815,785, entitled "Remote Phone-Based Access To A Universal Multimedia Mailbox" assigned to the same assignee as the present invention and filed concurrently herewith.

BACKGROUND OF THE INVENTION

1. Field of the Invention

The present invention relates to digital video browsing and more particularly to reviewing a digital video stored in a remote location by using a phone and a fax machine.

2. Description of the Prior Art

Digital video is currently being used in a wide variety of applications as a means for communications. Presently, the digital video is stored in a storage device (typically a tape or hard disk), and later displayed to the user. Such a system presumes the availability of a viewing device capable of playback of the video at full motion (e.g., 30 frames per second). It is an object of the present invention to provide for the reception of digital video without the availability of such a viewing device.

SUMMARY OF THE INVENTION

The present invention provides for the capability of reviewing a digital video stored in a remote location by using a phone and a fax machine. The system allows an individual to review the contents of the video in a two step process. The first step is to request a visual summary of the video which consists of still images corresponding to the frames where scenes change. The second step is to use this information to control the playback of the audio track using the keypad of a touchtone phone.

The present invention comprises two main components. The first main component, a digital video pre-processor, extracts information from the original video. This is performed in advance of the user's access. The second main component of the present invention, a phone-based video-playback attendant, receives remote instructions from the user via the telephone and presents the requested information.

DETAILED DESCRIPTION OF THE INVENTION

The present invention provides the means for accessing digital video through devices with more limited capabilities. More specifically, the present invention involves the joint use of telephones and fax machines to extract and present information from a video stored remotely. A typical application of this invention involves accessing digital video messages stored at a remote electronic mailbox.

Figure 1:
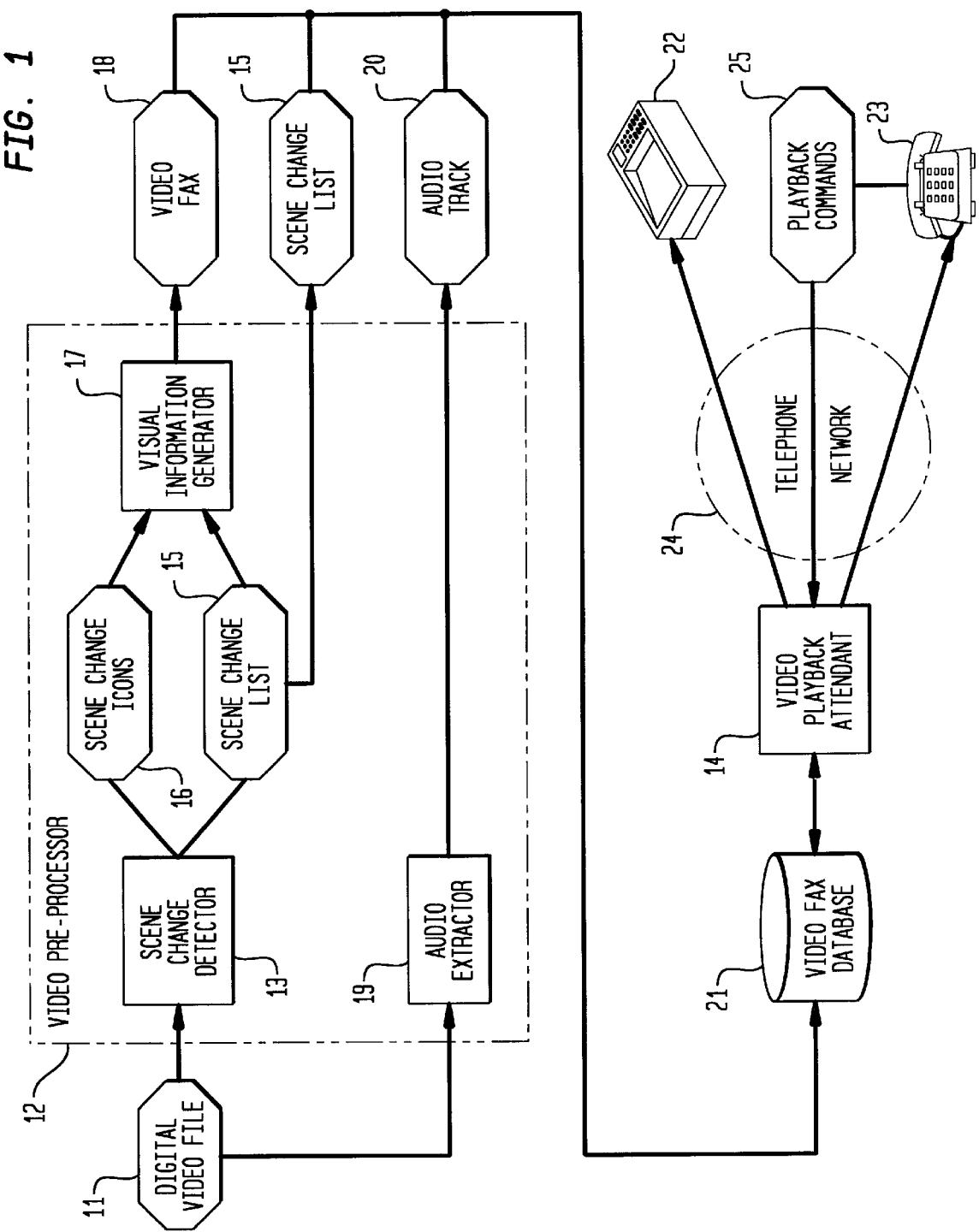
FIG. 1 illustrates a block diagram of the present invention.

FIG. 1, a block diagram of the present invention, illustrates the two main components of the present invention. The first main component, digital video pre-processor 12, extracts information from the original video. This is performed in advance of the user's access. The second main component of the present invention, phone-based video-playback attendant 14, receives remote instructions from the user via the telephone and presents the requested information. Digital video pre-processor 12 and phone-based video-playback attendant 14 will now be further described.

Video pre-processor 12 receives as an input, digital video, compressed by any of the standard formats (e.g., MPEG, MJPEG or AVI) and produces as an output a combination of visual and aural information suitable for presentation by using fax machines and telephones respectively. Please note that the present invention performs the same functions whether the fax and telephone are separate devices or whether the fax and telephone are integrated into one device.

Visual information is generated by video pre-processor 12 as follows. Digital video file 11, which contains the original video, is inputted to video pre-processor 12. The visual information is extracted by means of scene change detector 13 which is capable of automatically generating information regarding scene changes in the video. Such scene change detectors are available today as software components, e.g., U.S. Pat. No. 5,521,841 entitled "Browsing Contents of a Given Video Sequence" and assigned to the same assignee as the present invention. Scene change detector 13 produces the necessary information in the form of scene change list 15 which contains offset times with respect to the beginning of the video where the scene changes occur, and a collection of still images, called scene change icons 16, corresponding to the video frames where the scene changes occur.

Figure 2:
FIG. 2 illustrates a video fax developed by the present invention.

Visual information generator 17 of the present invention uses this information to produce a binary image, called video fax 18, which contains all of the icons sorted by time. Such video fax 18 is illustrated in FIG. 2. The following algorithm is used to generate this image.

Let N be the number of scene changes in the video
Let K be the number of icons per frame
Let icon[N] be an array containing the icon image
For z=1 To N Step K
  For x=z To z+K
    If x<N Then
      Insert x
      Insert icon[z]
    End If
    Insert new_line
  End For
End For Video faxes are stored in video fax database 21 by using a file format suitable for transmission via fax, e.g., TIFF or Postscript. Video fax database 21 could be contained within video pre-processor 12 or video playback attendant 14. Scene change list 15 could also be stored in the video fax database as a separate sequence of time codes. Any suitable text format, e.g., comma separated ASCII fields, can be used for this purpose.

The following will describe aural information generation. Generating the aural information is performed by audio extractor 19 which uses one of several existing tools (e.g. avitowav) to extract the audio track of digital video file 11. Audio track 20 could be stored in video fax database 21 but in a typical implementation, the extracted audio track 20 will be stored separately as an audio-only file using a format suitable for playback over phone 23, e.g., WAV or AU.

The following will describe video-playback attendant 14. Video playback attendant (VPA) 14 is a software system that operates at the location where the digital information extracted form the video is stored. The following hardware and software are needed in the present invention in addition to the standard functions of the operating system, e.g., Windows95. A fax/voice modem capable of detecting telephony or sending and receiving faxes is required as well as software drivers to control the operation of this modem. In particular, the hardware and software must be capable of answering a call, playing an audio file, in example a prompt, receiving user input in the form of keypad entries (0–9, #,*) and sending a fax.

In operation, the VPA 14 runs continuously until a request is received. This requests comes in the form a telephone call. The following interaction occurs when a call is detected.

1 Using telephone 23, the user dials a telephone number known in advance as the location where VPA 14 is running.

2 Upon detecting a ring, VPA 14 answers telephone 23 and plays back a greeting prompt asking the user to identify himself/herself by means of an authorization code entered by pressing keys on the phone keypad. VPA 14 compares this code against a list of valid users and makes a determination about how to proceed.

3 If the user cannot be properly identified as an authorized person, VPA 14 plays a dismissal prompt and terminates the call. If the user is properly authenticated, the system will playback a list of the videos available for browsing. For each element of the list, VPA 14 plays back information about the video, including its title and duration, using an existing text-to-speech engine.

4 At each point, the user is given the option, by pressing a number on the keypad, to select the video for viewing, waiting for the next option or exiting the system by hanging up.

5 When a video is selected, VPA 14 plays a prompt asking the user to enter the number of a close-by fax machine 22. The user enters this number using the keypad on telephone 23. When this action is completed VPA 14 retrieves the document generated above, video fax 18, and sends it to the user via fax machine 22 which uses the fax modem capabilities of a typical system. These capabilities include the ability of the modem to convert a digital representation of this document into a form suitable for fax transmission over telephone network 24.

6 Upon completion of the fax sending task, VPA 14 plays a prompt that gives the user, through playback commands 25, the options to playback the audio portion of the video. The following are examples of options available via the keypad of telephone 23.
  # toggle between pause and playback
  n# jump to the audio corresponding to the n-th scene in the video and continue playback.
  0# rewind to the beginning of the video
  * return to the video selection prompt (step 4)

The process continues until the user ends the call by hanging up.

It is not intended that this invention be limited by the hardware or software arrangement or operational procedures shown disclosed. This invention includes all of the alterations and variations thereto as encompassed within the scope of the claims as follows.

I claim:

1. A system for digital video browsing using a telephone and a fax machine, comprising:
    a video pre-processor for extracting audio information and visual information from a digital video file, wherein the video pre-processor comprises a scene change detector, a visual information generator connected to said scene change detector, and an audio extractor; and
    a video playback attendant connected to said video pre-processor, the video playback attendant capable of being accessed by a user via the telephone to retrieve at least a portion of the extracted audio and visual information using the telephone and the fax machine, respectively.

2. A system for digital video browsing using a telephone and fax as claimed in claim 1 further comprising:
    a video fax database connected between said video pre-processor and said video playback attendant.

3. A system for digital video browsing using a telephone and fax as claimed in claim 1 wherein:
    said scene change detector extracts visual information from said digital video file and automatically generates information regarding scene changes.

4. A system for digital video browsing using a telephone and fax as claimed in claim 3 wherein said information regarding scene changes comprises:
    scene change icons which are a collection of still images corresponding to video frames where scene changes occur; and,
    a scene change list which contains offset times with respect to where said scene changes occur.

5. A system for digital video browsing using a telephone and fax as claimed in claim 3 wherein:
    said visual information generator receives said information regarding scene changes and produces a binary image, a video fax, which contains all icons sorted by time.

6. A system for digital video browsing using a telephone and fax as claimed in claim 5 wherein:
    said visual information generator produces said binary image according to:

For z=1 To N Step K
  For x=z To z+K
    If x<N Then
      Insert x
      Insert icon
    End If
    Insert new_line
  End For
End For where: N is a number of scene changes in video, K is number of icons per frame, and, icon is an array containing an icon image.

7. A system for digital video browsing using a telephone and fax as claimed in claim 5 wherein:
    said video fax database stores said video fax by using a file format suitable for transmission via fax.

8. A system for digital video browsing using a telephone and fax as claimed in claim 1 wherein:
    said audio extractor extracts an audio track from said digital video file.

9. A system for digital video browsing using a telephone and fax as claimed in claim 1 wherein:
    said video playback attendant operates at a location where digital information extracted from said digital video file is stored.

10. A method for digital video browsing using a telephone and a fax machine, comprising the steps of:
    pre-processing a digital video file into a video fax, a scene change list and an audio track, wherein pre-processing comprises the steps of detecting a scene change to provide scene chance information, generating visual information from said scene change information and extracting audio information, from said digital video file; and, accessing a video playback attendant by a user using the telephone to browse the pre-processed digital video file and retrieve selected portions of the video fax and audio track of the pre-processed digital video file via the fax machine and the telephone, respectively.

11. A method for digital video browsing using a telephone and fax as claimed in claim 10 further comprising the step of:

storing said video fax in a video fax database.

12. A method for digital video browsing using a telephone and fax as claimed in claim 10 wherein detecting a scene change comprises the steps of:

extracting input visual information from said digital video file; and, automatically generating said scene change information.

13. A method for digital video browsing using a telephone and fax as claimed in claim 10 wherein detecting a scene change comprises the steps of:

generating scene change icons which are a collection of still images corresponding to video frames where scene changes occur; and, generating a scene change list which contains offset times with respect to where said scene changes occur.

14. A method for digital video browsing using a telephone and fax as claimed in claim 13 wherein generating visual information from said scene change information comprises the steps of:

receiving said scene change icons;

receiving said scene change list; and, producing a binary image, a video fax, which contains all icons sorted by time.

15. A method for digital video browsing using a telephone and fax as claimed in claim 14 wherein generating visual information from said scene change information comprises the step of:

producing said binary image according to:
For z=1 To N Step K
  For x=z To z+K
    If x<N Then
      Insert x
      Insert icon
    End If
    Insert new_line
  End For
End For where: N is a number of scene changes in video, K is number of icons per frame, and, icon is an array containing an icon image.

16. A method for digital video browsing using a telephone and fax as claimed in claim 11 wherein storing said video fax in a video fax database comprises the step of:

using a file format suitable for transmission via said fax.

17. A method for digital video browsing using a telephone and fax as claimed in claim 10 wherein utilizing a video playback attendant comprises the step of:

operating at a location where digital information extracted from said digital video file is stored.

18. A system for digital video browsing using a telephone and a fax machine, comprising:

video pre-processor means for receiving a digital video file, the video pre-processor comprising:

scene change detector means for generating a scene change list comprising a list of offset times of detected scene changes, and generating a plurality of still images corresponding to video frames where the detected scene changes occur;

visual information generator means connected to said scene change detector means, for generating a video fax comprising the plurality of still images sorted in accordance with said offset times; and audio extraction means for extracting an audio track from the digital video file;

video fax database means connected to said video pre-processor means for storing said video fax; and, video playback attendant means connected to said video fax database means, the video playback attendant means being accessible by a user via the telephone to retrieve selected portions of the video fax and audio track via the fax machine and the telephone, respectively.

* * * * *